United States Patent [19]
Lawrenson et al.

[11] Patent Number: 5,994,854
[45] Date of Patent: Nov. 30, 1999

[54] ACOUSTIC RESONATOR POWER DELIVERY

[75] Inventors: Christopher C. Lawrenson, Richmond; Thomas W. Van Doren, Fredericksburg; F. Joseph Keith; Timothy S. Lucas, both of Richmond, all of Va.

[73] Assignee: MacroSonix Corporation, Richmond, Va.

[21] Appl. No.: 08/979,931

[22] Filed: Nov. 26, 1997

[51] Int. Cl.⁶ .................................................. H02K 33/00
[52] U.S. Cl. ............................ 318/114; 310/17; 310/15; 318/119
[58] Field of Search ...................... 318/114, 119, 318/126, 115, 460; 73/662, 665, 666, 668; 310/15, 17, 20, 23, 36

[56] References Cited

U.S. PATENT DOCUMENTS

| | | | |
|---|---|---|---|
| 3,958,450 | 5/1976 | Kleesattel . | |
| 4,490,654 | 12/1984 | Buchas | 318/130 |
| 4,621,221 | 11/1986 | Lee | 318/123 |
| 5,023,526 | 6/1991 | Kuwabara et al. | 318/116 |
| 5,174,130 | 12/1992 | Lucas | 62/498 |
| 5,231,337 | 7/1993 | van Namen | 318/128 |
| 5,319,938 | 6/1994 | Lucas | 62/6 |
| 5,515,684 | 5/1996 | Lucas et al. | 62/6 |

*Primary Examiner*—Bentsu Ro
*Attorney, Agent, or Firm*—Foley & Lardner

[57] ABSTRACT

A vibrational acoustic unit comprises a dynamic force motor, a power take-off spring having one end attached to the dynamic force motor and the other end attached to a fluid filled acoustic resonator. The motor oscillates the entire acoustic resonator so as to excite a resonant mode of the acoustic resonator.

A method of delivering power to an acoustic resonator comprises resiliently connecting a motor to the resonator, and driving the motor to oscillate the entire acoustic resonator so as to excite a resonant mode of the acoustic resonator.

21 Claims, 6 Drawing Sheets

ACOUSTIC RESONATOR POWER DELIVERY

BACKGROUND OF THE INVENTION

1. Field of Invention

This invention relates to power delivery systems for the transduction of mechanical power into acoustic power through the oscillation of an entire resonator to excite a resonant mode, having applications to any acoustic resonator shape.

2. Description of Related Art

There are a number of different ways to deliver power to a standing acoustic wave which are known in the field of acoustics. The method of entire resonator driving, as described in U.S. Pat. Nos. 5,319,938 and 5,515,684, depends on vibrating the entire resonator back and forth in order to use the resonator's inner surface area as the power delivery surface. This approach requires a motor that provides a dynamic force to create the resonator oscillation.

As shown in U.S. Pat. Nos. 5,319,938; 5,231,337; and 5,515,684, incorporated herein by reference, motors used for entire resonator driving typically comprise two moving motor components. FIG. 1 illustrates a prior art device where motor component 4 is rigidly connected to the fluid-filled acoustic resonator 2, and motor component 6 is resiliently mounted to motor component 4 by a spring 8. When a dynamic force is generated between these two motor components, they move dynamically in reactive opposition to each other, thus causing the entire resonator to oscillate so that power is delivered to the fluid. The heavier motor component 6 may be resiliently connected to ground.

FIG. 2 shows a lumped element diagram of the prior art device of FIG. 1. The fluid within the resonator is modeled as spring 14 and mass 12. Associated with each spring is a damper. Since motor mass 4a and resonator mass 2a are rigidly connected they comprise a single moving mass of the system.

Power is delivered to the standing wave according to $1/(2\omega)FA \sin \theta$, where $\omega=2\pi f$ with f being the drive frequency, F is the magnitude of the force exerted at the face 10 of motor mass 4a, A is the magnitude of the acceleration of motor mass 4a and the resonator mass 2a, and $\theta$ is the (temporal) phase angle between F and A. The motor must supply not only the force needed to deliver power to the acoustic load but also to directly oscillate motor mass 4a and resonator mass 2a back and forth. The force required to oscillate masses 2a and 4a is not delivered to the acoustic load. However, generating this mass-driving force results in energy losses due to the motor's transduction efficiency and thus reduces the overall efficiency of the power delivery system.

A further source of inefficiency in the prior art system shown in FIGS. 1 and 2 is its limited control of the power factor $\sin \theta$. If $\theta=90°$ then the power factor $\sin \theta=1$. If $\theta$ assumes values progressively less or greater than 90° then the required motor force increases thus minimizing the energy efficiency of the power delivery system. Adjusting the resonator mass 2a and the motor mass 4a can help tune the power factor toward unity, but structural stiffness and pressure rating requirements for the resonator as well as design requirements for the motor will limit the degree of freedom to make such adjustments.

It is well known in the art of vibrational motors that adjusting the stiffness of spring 8a of FIG.2 in order to tune the mechanical resonance close to the acoustic resonance will reduce the required motor force for a given power delivery. However, this can result in greatly amplified displacements between the moving components which generate excessive noise and higher spring stresses. A control is generally required to keep the drive frequency locked to the acoustic resonance since sound speed changes due to heating and other effects will cause the acoustic resonant frequency to drift during operation. If the mechanical resonance frequency is tuned close to the acoustic resonance, then severe control problems can occur due to resonance repulsion phenomena if the resonant frequency drift brings the two resonant peaks too close together.

SUMMARY OF THE INVENTION

It is an object of the present invention to provide a power take off (PTO) spring between a dynamic force motor and a resonant acoustic load which for a given acoustic power delivery reduces the required motor force, reduces the motor size requirement, allows greater control of mechanical power factor, reduces motor energy dissipation losses due to lower required forces thus improving system efficiency, allows tuning of all the relative displacements and phases of all oscillating mass components, and allows greater design flexibility on overall motor topology. These and other objects and advantages of the invention will become apparent from the accompanying specifications and drawings, wherein like reference numerals refer to like parts throughout.

The invention may be characterized as a vibrational acoustic unit comprising a dynamic force motor, a power take-off spring having one end attached to the dynamic force motor and the other end attached to a fluid filled acoustic resonator, wherein the entire acoustic resonator is oscillated so as to excite a resonant mode of the acoustic resonator.

The invention may also be characterized as a method of delivering power to an acoustic resonator comprising the steps of resiliently and exclusively connecting a motor to the resonator, and driving the motor to oscillate the entire acoustic resonator so as to excite a resonant mode of the acoustic resonator.

The invention may further be characterized as a method of driving an acoustic resonator comprising the steps of connecting a motor to the resonator using a resilient connection, and driving the motor to oscillate the entire acoustic resonator so as to excite a resonant mode of the acoustic resonator, the motor exciting the resonant mode through the resilient connection.

DETAILED DESCRIPTION OF THE PREFERRED EMBODIMENTS

Figure 1:
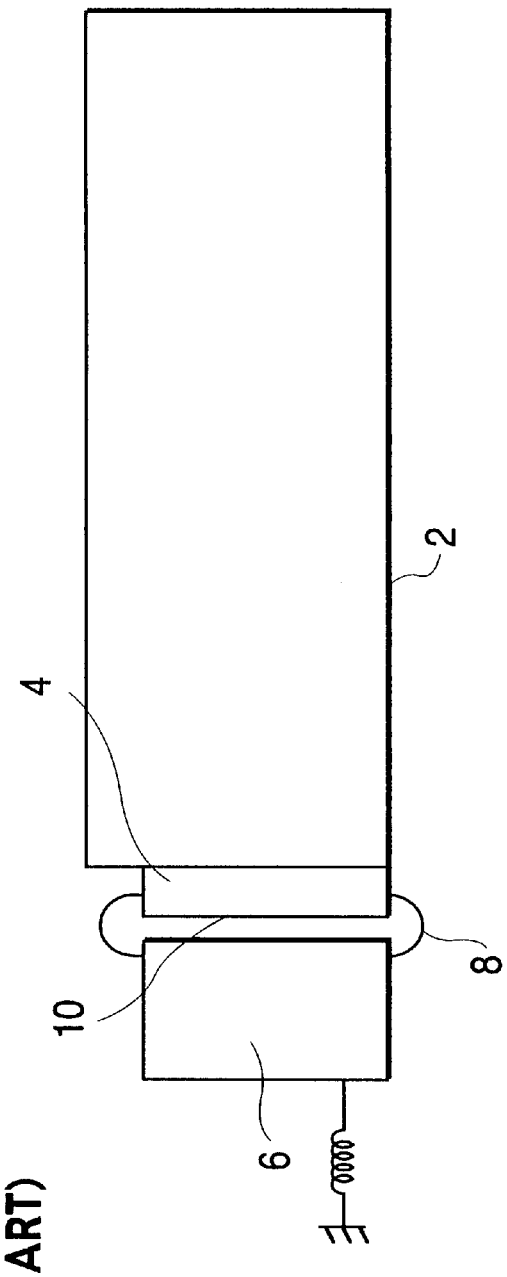
FIG. 1 illustrates a prior art acoustic power delivery device.
Figure 2:
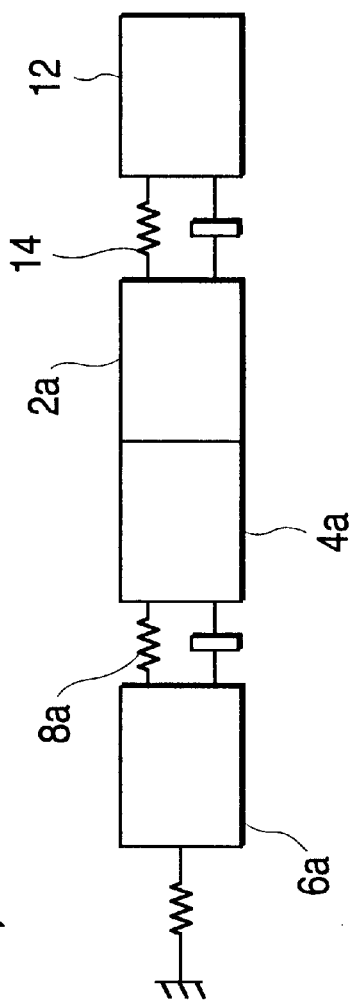
FIG. 2 is a lumped element diagram of the FIG. 1 prior art device.
Figure 3:
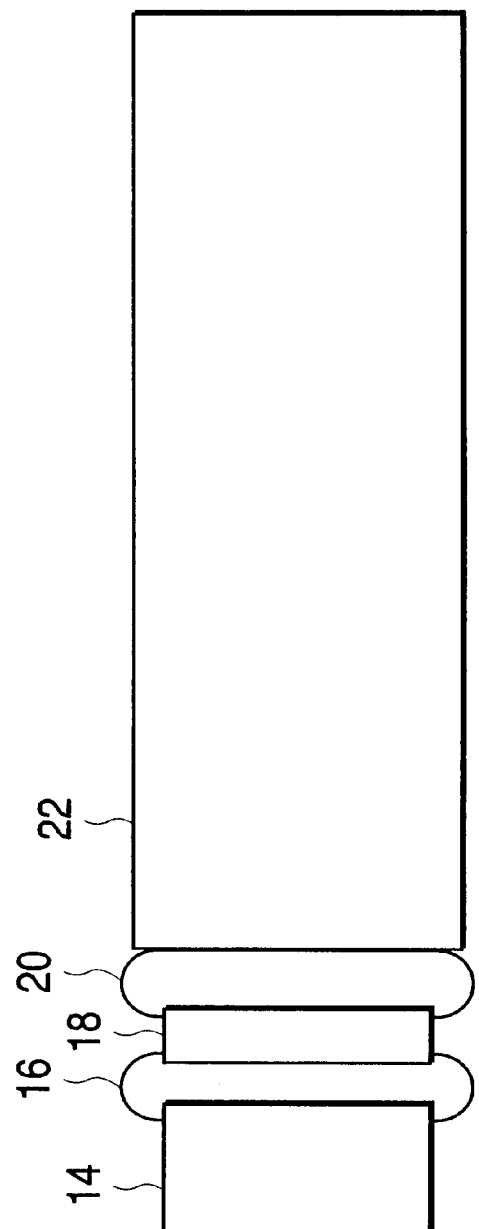
FIG. 3 illustrates an embodiment of the present invention having a two-mass dynamic force motor.

FIG. 3 illustrates an embodiment of the present invention where a power take off (PTO) spring 20 has been added to the prior art device of FIG. 1 between the moving motor mass 18 and resonator 22. In operation, an dynamic force of frequency f is created between motor mass 14 and motor mass 18 which causes motor masses 14 and 18 to oscillate at frequency f in reactive opposition to each other. The periodic displacement of motor mass 18 causes a dynamic force to be transmitted through spring 20 to resonator 22 which in turn causes a periodic displacement of resonator 22 at frequency f. If frequency f is equal to a standing wave mode frequency of the resonator which can be excited by the resonator's motion, then the periodic displacement of resonator 22 will transfer energy to that mode.

Figure 4:
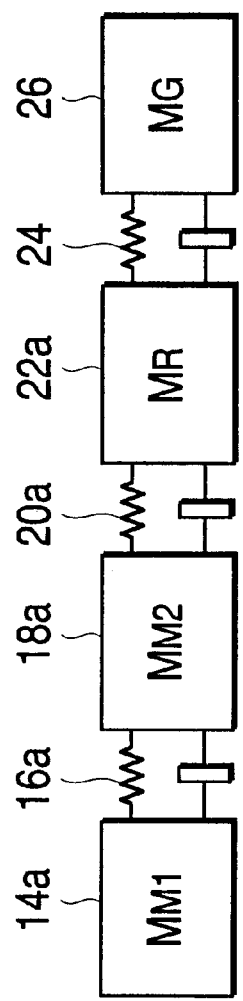
FIG. 4 is a lumped element diagram of the embodiment of FIG. 3.

FIG. 4 provides a lumped element diagram of the embodiment of FIG. 3, comprising motor mass 14a, motor mass 18a, motor spring 16a, PTO spring 20a, resonator mass 22a, fluid spring 24 and fluid mass 26. When a mode of resonator 22 is being driven, the phases between the displacements of all masses 14a, 18a, 22a, and 26 are determined by the respective mass values and by the respective stiffness and damping values of motor spring 16a, PTO spring 20a, and fluid spring 24.

Adjusting the stiffness of PTO spring 20a of FIG. 4 provides a means to tune the mechanical power factor seen by the motor (represented by masses 14a and 18a) as it delivers power to the resonator, thus reducing the motor force required for a given power delivery to the load. PTO spring 20a also prevents rigid coupling of resonator mass 22a with motor mass 18a, thereby making possible designs which reduce the motor force required for a given power delivery to the load. Reducing the required motor force results in reducing energy losses resulting from the motor's transduction efficiency and thus improves the overall efficiency of the power delivery system. Reducing the required motor force also reduces the required size of the motor, thus reducing the amount of motor materials required for a given power delivery to the load.

PTO spring 20a of FIG. 4 allows power factors approaching unity to be achieved without having to tune any of the mechanical resonances, associated with springs 16a and 20a, close the driven acoustic resonance. Thus, component displacements are minimized, noise is reduced, and excessive spring stresses are avoided. Providing high power factors, without the risk of crossing acoustical and mechanical resonance frequencies, eliminates the severe control problems which occur due to resonance repulsion phenomena.

The stiffness of each mechanical spring can be chosen so that (i) the mechanical resonance frequency where motor spring 20a sees its maximum displacement is above the acoustic resonance frequency and (ii) the mechanical resonance frequency where spring 16a sees its maximum displacement is below the acoustic resonance frequency. This design provides two preferred operating characteristics. First, fluid heating may cause the acoustic resonance frequency to increase during operation and this design assures that the acoustic resonance frequency will not cross the mechanical resonance frequency associated with the maximum displacement of spring 16a. Second, provided that the mechanical resonance frequency associated with the maximum displacement of spring 20a is sufficiently above the acoustic resonance frequency so that the two resonances never overlap during operation, then some benefit can be derived. As the acoustic resonance frequency increases, accelerations can also be made to increase thereby transferring more power to the load for the same motor force. Proper selection of component mass and spring stiffness can also cause the power factor measured at the air gap to improve as the acoustic resonance frequency increases.

In general, the addition of PTO spring 20a allows greater system design flexibility, since the properties of each mechanical element are more independent. PTO spring 20a allows tuning of all the relative component displacements, relative displacement phases, and component masses.

The power delivery unit should be resiliently mounted to ground, since each component of the system oscillates. For a given design, the specific acceleration of masses depends on the mass of each component and stiffness and damping of each spring. The mass with the lowest acceleration provides a good point for resilient mounting to ground.

Figure 5:
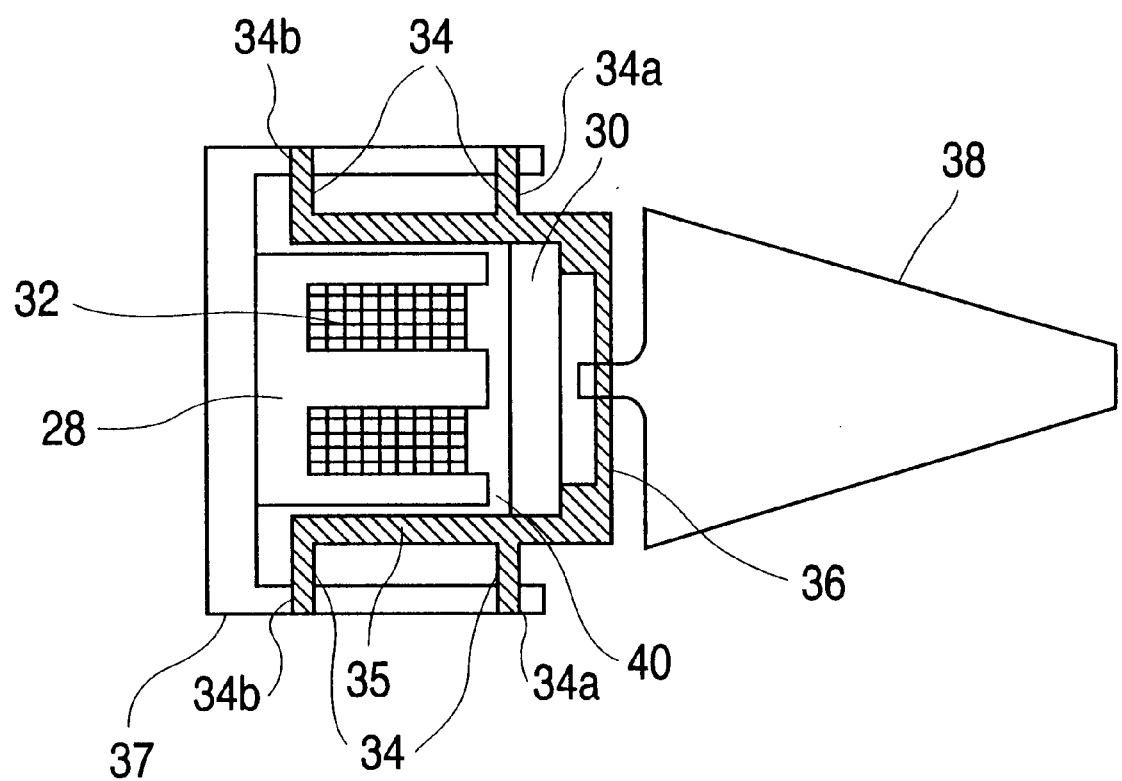
FIG. 5 illustrates an embodiment of the present invention having a two-mass dynamic motor including a flat lamination variable-reluctance EI motor.

FIG. 5 shows a cross sectional view of a variable reluctance motor used as a two-mass dynamic force motor in accordance with the present invention. The variable reluctance motor consists of a first motor mass 28 formed by a stack of flat "E" laminations rigidly joined together so that the stack forms a single unit, a second motor mass 30 formed by a stack of flat "I" laminations rigidly joined together so that the stack forms a single unit, a conducting coil 32 wound around the center leg of the E lamination stack, leaf springs 34, with levels 34a and 34b, which resiliently join the first and second motor masses 28 and 30 together via carriages 35 and 37, and a PTO leaf spring 36 which resiliently connects the second motor mass 30 to resonator 38. Second motor mass 30 is rigidly connected to carriage 35, and first motor mass 28 is rigidly connected to carriage 37. Carriages 35 and 37 slide back and forth relative to one another. The motor laminations can be constructed of silicon steel laminations which are typically used in transformers. The mass of carriage 35 may be considered to be part of the second moving mass, and the mass of carriage 37 may be considered to be part of the first moving mass. The space between the three legs of the E laminations and the I laminations comprises an air gap 40. The two levels of leaf springs 34, levels 34a and 34b, allow planer relative motion of second motor mass 30 and first motor mass 28 so as to keep the instantaneous air gap 40 everywhere uniform. Single level springs or any other spring topology could also be used which provide planer motion of the components.

In operation, when an alternating current is established in coil 32 a time varying magnetic flux is created within air gap 40 which is accompanied by a static attractive force and a time varying attractive force between the first and second motor masses 28 and 30. Motor masses 28 and 30 respond to this time varying force by oscillating in reactive opposition to each other. Leaf springs 34 provide a bias force to prevent the attractive force from drawing motor masses 28 and 30 together while still allowing them to oscillate. The periodic oscillation of motor mass 30 applies a dynamic force through PTO spring 36 to resonator 38, thus causing resonator 38 to oscillate along its cylindrical axis. If the oscillation frequency of resonator 38 is equal to one of the standing wave mode frequencies which can be excited by the resonator's motion, then the periodic displacement of resonator 22 will transfer energy into that mode. Variable reluctance motors provide high energy efficiency when small displacements and large forces are required, which is typically the case for acoustic resonators.

Figure 6:
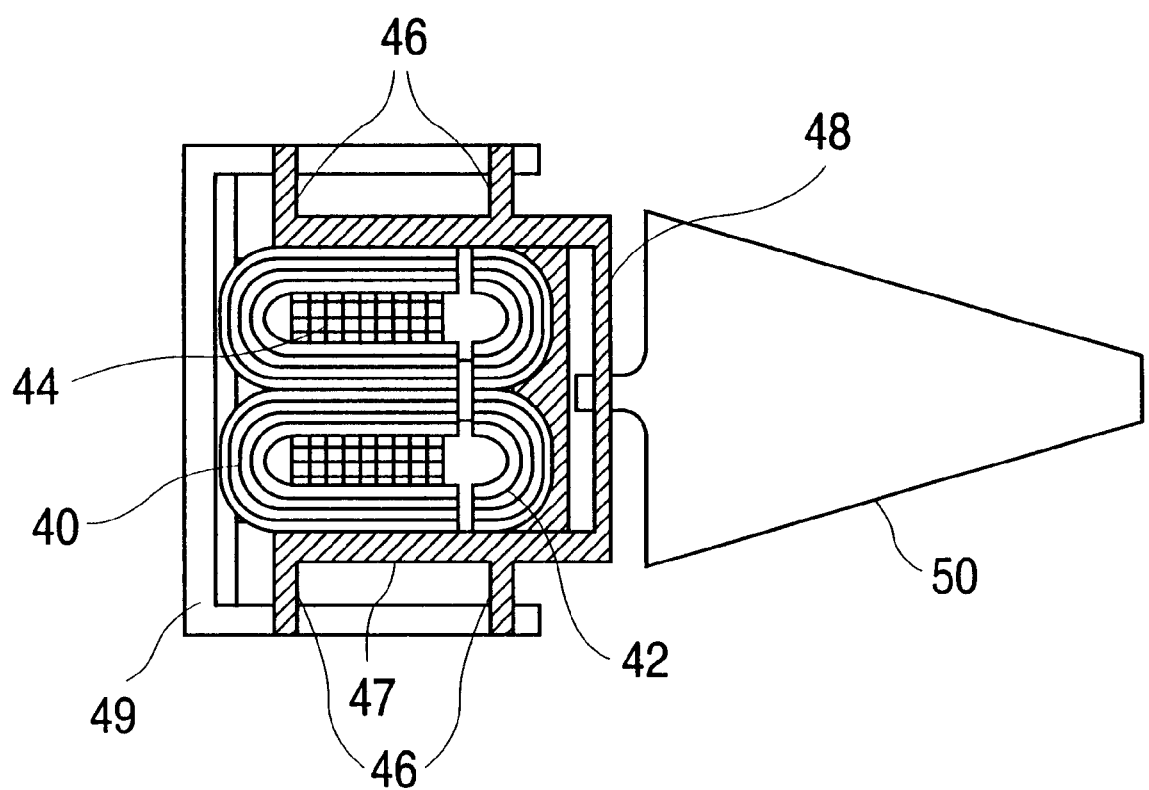
FIG. 6 illustrates an embodiment of the present invention having a two-mass dynamic motor including a tape-wound lamination variable-reluctance motor.

FIG. 6 shows a variable reluctance motor used as a two-mass dynamic force motor in accordance with the present invention, which reduces the portion of total magnetic losses caused by non-grain oriented magnetic flux. The variable reluctance motor consists of a first motor mass 40 formed by tape-wound laminations and joined to each other so as to form a single unit, a second motor mass 42 formed by tape-wound laminations and joined to each other so as to form a single unit, a conducting coil 44 wound around the center leg of the first motor mass, leaf springs 46 which resiliently join the first and second motor masses 40 and 42 together via carriages 47 and 49, and a PTO leaf spring 48 which resiliently connects the second motor mass 42 to resonator 50. The mass of carriage 47 may be considered to be part of the second moving mass, and the mass of carriage 49 may be considered to be part of the first moving mass. In operation the motor of FIG. 6 operates in the same manner as the motor of FIG. 5.

Figure 7:
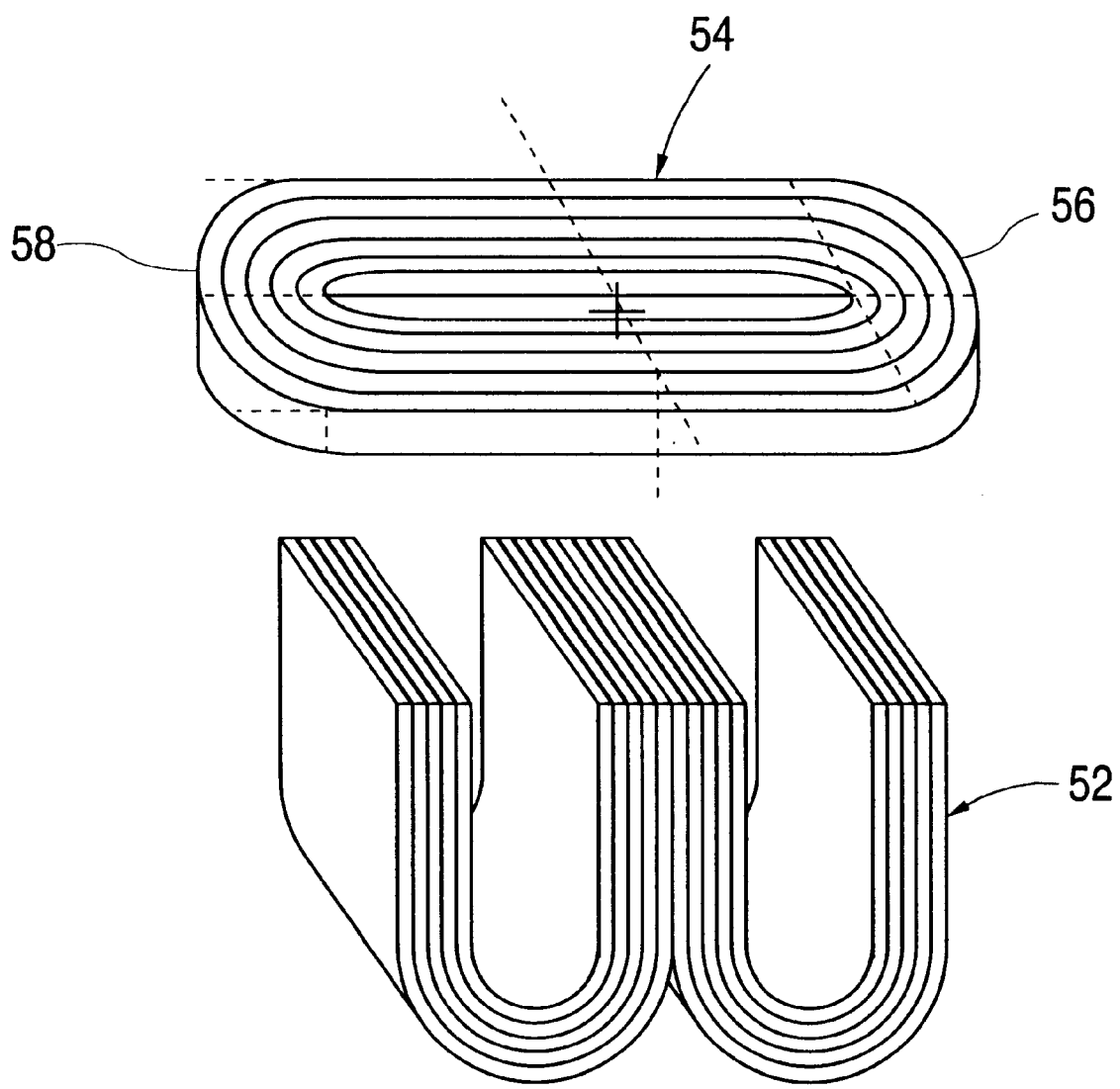
FIG. 7 illustrates an alternative magnetic structure for a variable-reluctance two-mass dynamic motor.

FIG. 7 illustrates an alternative magnetic structure for a variable-reluctance motor having first motor mass 52 formed of two tape-wound laminations and a second motor mass 54 formed of a single tape-wound lamination. While second motor mass 54 does not prevent cross-grain field orientation, it does provide a simple and very rigid structure having ends 56 and 58 which provide convenient connection points for springs, carriages or other hardware. Many combinations of tape-wound and stacked flat lamination components can be combined based on given design requirements and will suggest themselves to those skilled in the art.

The PTO spring of the present invention can be used in combination with any type of dynamic force motor. All motors may be thought of as providing a dynamic force to a member causing some movement in that member, however small. Thus, all the motors, including all motors described herein are dynamic force motors.

Figure 8:
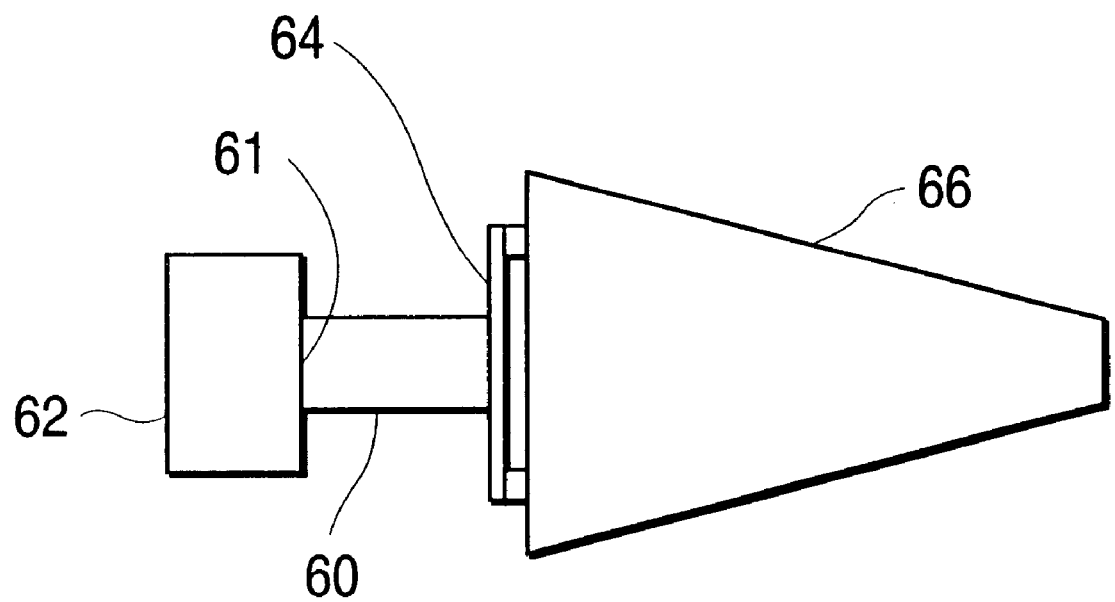
FIG. 8 illustrates an embodiment of the present invention having a single-mass flexing motor, which could include a piezoelectric element or a magnetostrictive element.

FIG. 8 describes another type of dynamic force motor. FIG. 8 illustrates an embodiment of the present invention having a PTO spring 64 with one end connected to a flexing dynamic force motor 60 and the other end connected to a resonator 66. Reaction mass 62 is preferably rigidly connected to flexing dynamic motor 60 at an end 61 thereof. Reaction mass 62 may be also be resiliently connected to flexing dynamic motor 60 at end 61, and in this case it is preferred that the resilient connection be relatively stiff compared to the spring constant or stiffness of PTO spring 64. Flexing dynamic motor 60 can be a piezoelectric element, a magnetostrictive element, or any other element which provides a dynamic force by periodically flexing or changing its overall dimensions.

In operation motor 60 of FIG. 8 undergoes a periodic change in its dimension thus creating a dynamic force of frequency f which is communicated to resonator 66 through PTO spring 64. In embodiments in which the dynamic force motor 60 has a small mass relative to that of the reaction mass 62, the force of the motor 60 is effectively transferred to the resonator 66 by virtue of the reaction mass 62 and PTO spring 64 which causes the periodic displacement of resonator 66 at frequency f. Reaction mass 62 prevents excessive accelerations of the reaction mass end 61 of motor 60 and maximizes the force of motor 60 applied to PTO spring 64. If the frequency f is equal to a standing wave mode frequency of the resonator which can be excited by the resonator's motion, then the periodic displacement of resonator 66 will transfer energy into that mode. The embodiment of FIG. 8 can be operated without PTO spring 64 by rigidly connecting motor 60 to resonator 66. However, this would eliminate the advantages described above.

It may be seen that the embodiments of the invention utilize the PTO spring as the exclusive mechanism to couple the active force components of the motor to the resonator. Thus, the moving elements of the motor which are effective in causing oscillation of the resonator are isolated from the resonator by the resilient coupling mechanism, i.e., the PTO spring. In contrast, prior art devices couple the motor to the resonator by a rigid connection and do not utilize a PTO spring as the primary force path from the motor to the resonator.

While the above description contains many embodiments of the invention, these should not be construed as limitations on the scope of the invention, but rather as an exemplification of preferred embodiments thereof. Other embodiments which will occur to those skilled in the art are within the scope of the present invention. For example, any motor which generates a dynamic force can be employed such as off-concentric rotational motors, electrodynamic motors, and electromagnetic motors. Variable reluctance motors need not use only laminations but can be formed from pressed materials that have multidirectional grain properties so as to avoid off-axis grain magnetic losses. The springs may comprise any spring type which accommodates a particular design such as coil springs, leaf springs, bellville springs, magnetic springs, gas springs or other devices that provide a resilient coupling. The fluids within the resonators of the present invention can be either liquids or gases. Any type of acoustic resonator can be used including cylindrical resonators or Resonant Macrosonic Synthesis (RMS) resonators of any shape as described for example in U.S. Pat. Nos. 5,515,684, 5,319,938, and 5,174,130 the entire contents of which are hereby incorporated by reference.

It should further be appreciated that an excited resonance mode of the resonator may generally take place anywhere on the resonance response curve as, for example, at full or near full power, at half power points, quarter power points or the like. Thus a resonant mode can be excited over a range of frequencies.

The scope of the present invention is not limited to particular applications of the acoustic resonator to which power is delivered. For example the present invention can be applied to acoustic resonators for oil-less acoustic compressors and pumps for air compression, refrigeration, comfort air-conditioning, hazardous fluids, ultra-pure fluids, natural gas, and commercial gases; acoustic resonators for process control; acoustic resonators used as process reactors for chemical and pharmaceutical industries; acoustic resonators for separation of gases including pressure swing adsorption; and acoustic resonators for agglomeration, levitation, mixing, and pulverization to name a few. Such applications may or may not include RMS resonators. While omitted for clarity, such applications of the invention may utilize inlet/outlet valves and heat exchange apparatus as shown in FIG. 13 of U.S. Pat. No. 5,319,938 and FIG. 16 of U.S. Pat. No. 5,515,684.

Accordingly, the scope of the invention should be determined not by the embodiments illustrated, but by the appended claims and their equivalents.

What is claimed is:

1. A vibrational acoustic unit comprising:
   a motor having motor components, and
   a power take-off spring having one end attached to at least one of said motor components and the other end attached to a fluid filled acoustic resonator, and wherein no motor components are rigidly attached to said resonator, wherein the entire acoustic resonator is oscillated so as to excite a resonant mode of said acoustic resonator.

2. A vibrational acoustic unit according to claim 1, wherein said motor comprises a first moving mass and a second moving mass between which an alternating force is exerted, a motor spring having one end fastened to said first moving mass and having its other end fastened to said second moving mass, and said power take-off spring having said one end attached to said second moving mass.

3. A vibrational acoustic unit according to claim 2, wherein the stiffness of said power take-off spring provides a resonance between the resonator and the second moving mass whose frequency is greater than the excited resonance mode frequency of said acoustic resonator.

4. A vibrational acoustic unit according to claim 3, wherein the stiffness of said motor spring provides a resonance between said first and second moving masses whose frequency is less than the excited resonance frequency of the acoustic resonator.

5. A vibrational acoustic unit according to claim 2, wherein the stiffness of said motor spring provides a resonance between said first and second moving masses whose frequency is less than the excited resonance frequency of the acoustic resonator.

6. A vibrational acoustic unit according to claim 2, wherein said first and second moving masses comprise a variable reluctance motor.

7. A vibrational acoustic unit according to claim 6, wherein said first moving mass comprises a stack of E-shaped laminations and said second moving mass comprises a stack of I-shaped laminations.

8. A vibrational acoustic unit according to claim 6, wherein said first moving mass comprises tape-wound laminations and said second moving mass comprises tape-wound laminations.

9. A vibrational acoustic unit according to claim 2, wherein said first and second moving masses comprise an electrodynamic motor.

10. A vibrational acoustic unit according to claim 2, wherein said first and second moving masses comprise an electromagnetic motor.

11. A vibrational acoustic unit according to claim 1, wherein said motor comprises an off-concentric rotational motor.

12. A vibrational acoustic unit according to claim 1, wherein said motor comprises a piezoelectric motor.

13. A vibrational acoustic unit according to claim 1, wherein said motor comprises a magnetostrictive motor.

14. A vibrational acoustic unit according to claim 1, wherein said fluid-filled acoustic resonator comprises a process reactor.

15. A vibrational acoustic unit according to claim 1, wherein said fluid-filled acoustic resonator comprises a chamber for pressure swing adsorption.

16. A vibrational acoustic unit according to claim 1, wherein said fluid-filled acoustic resonator comprises a chamber for an acoustic compressor.

17. A vibrational acoustic unit according to claim 1, wherein said fluid-filled acoustic resonator comprises an RMS resonator.

18. A method of driving an acoustic resonator comprising the steps of:
    connecting a motor to said resonator exclusively using a resilient connection such that said motor is not rigidly connected to said resonator, and
    driving said motor to oscillate the entire acoustic resonator so as to excite a resonant mode of said acoustic resonator, said motor exciting said resonant mode through said resilient connection.

19. A method of driving an acoustic resonator comprising the steps of:
    connecting a motor to said resonator exclusively using a resilient connection such that said motor is not otherwise mechanically connected to oscillate said resonator, and
    driving said motor to oscillate the entire acoustic resonator so as to excite a resonant mode of said acoustic resonator, said motor exciting said resonant mode exclusively through said resilient connection.

20. A method of delivering power to an acoustic resonator comprising the steps of:
    connecting a motor to said resonator using a power take-off spring as the sole mechanism to couple movement of said motor to said resonator, and
    driving said motor to oscillate the entire acoustic resonator so as to excite a resonant mode of said acoustic resonator, said motor not otherwise mechanically connected to move said resonator.

21. A method of delivering power to an acoustic resonator comprising the steps of:
    resiliently and exclusively connecting a motor to said resonator, and
    driving said motor to oscillate the entire acoustic resonator so as to excite a resonant mode of said acoustic resonator, said motor not otherwise mechanically connected to drive said resonator.

* * * * *